United States Patent

Sunada et al.

[11] 4,040,508
[45] Aug. 9, 1977

[54] CONTROL CIRCUIT FOR CONTROLLING THE SHAFT SPEED OF A MOTOR HAVING CLUTCH AND BRAKE DEVICES

[75] Inventors: Masayoshi Sunada; Kuniaki Kubokura, both of Hitachi, Japan

[73] Assignee: Hitachi, Ltd., Japan

[21] Appl. No.: 648,674

[22] Filed: Jan. 13, 1976

[30] Foreign Application Priority Data

Jan. 20, 1975 Japan .................................. 50-7810

[51] Int. Cl.² .......................................... F16D 67/07
[52] U.S. Cl. .............................. 192/12 D; 192/104 R; 310/95; 235/103.5 R
[58] Field of Search ............... 192/12 D, 18 B, 103 R, 192/104 R; 310/95

[56] References Cited

U.S. PATENT DOCUMENTS

| | | | |
|---|---|---|---|
| 3,371,760 | 3/1968 | Willsea | 192/12 D X |
| 3,487,438 | 12/1969 | Becker et al. | 192/104 R X |
| 3,505,548 | 4/1970 | Seesselberg et al. | 192/104 R X |
| 3,599,764 | 8/1971 | Daab et al. | 192/12 D |
| 3,915,271 | 10/1975 | Harper | 192/103 R |

*Primary Examiner*—Benjamin W. Wyche
*Attorney, Agent, or Firm*—Craig & Antonelli

[57] ABSTRACT

A control circuit for controlling the shaft speed of a motor having clutch and brake devices comprises a speed detector for detecting the actual rotating speed of the motor and generating a first pulse signal having a period in inverse proportion to the actual rotating speed, a speed selector for setting the desired-speed of the shaft, a signal generator for generating a second pulse signal having a period in inverse proportion to the desired-speed from the speed selector, a first means for detecting the ratio of the period of the first signal to the period of the second signal, and a second means for controlling the operation of the clutch and brake devices in response to the detected ratio.

7 Claims, 14 Drawing Figures 4,040,508

CONTROL CIRCUIT FOR CONTROLLING THE SHAFT SPEED OF A MOTOR HAVING CLUTCH AND BRAKE DEVICES

BACKGROUND OF THE INVENTION

1. Field of the Invention

The present invention relates to a control circuit for a motor wherein clutch to brake devices are electromagentically actuated to intermittently connect the motor and a load, thereby controlling the rotating speed of a shaft.

2. Description of the Prior Art

One system for controlling the shaft speed of a clutch motor having clutch and brake devices is disclosed in U.S. Pat. No. 3,599,764. In the shaft speed control system, the operation speed of the drive shaft of a utilization device is maintained at a preselected value by generating a rectified DC signal and a superimpsed AC signal when it falls below a reference value, indicating a low shaft speed and causing energization of the clutch for increasing the shaft speed. When the shaft speed becomes greater than selected value, the generated signal exceeds the reference value and is detected by a second solid state switch causing action of the brake until the shaft speed decreases. Alternating pulse-like nonoverlapping actuation of the clutch and brake devices maintains the utilization device drive shaft at the selected speed. The control system, however, forms an AC signal of the shaft speed measuring means into the superimposed AC signal by a rectifier and an R-C element having a predetermined time constant, and therefore involves the disadvantage that the shaft speed cannot be precisely controlled over a wide range from low speeds to high speeds.

SUMMARY OF THE INVENTION

An object of this invention is to provide a control circuit for controlling the shaft speed of a motor having clutch and brake devices to control the shaft speed accurately and highly reliably over a wide range of rotating speeds.

In order to accomplish the above object, one preferred embodiment of the invention comprises means to detect the ratio between the actual speed and the desired-speed of a shaft, and means to control the operations of clutch and brake devices in response to the ratio. By controlling the shaft speed in response to the ratio between the actual speed and the desired-speed of the shaft, a precise control circuit can be constructed with comparatively simple logical circuitry.

DETAILED DESCRIPTION

Figure 1:
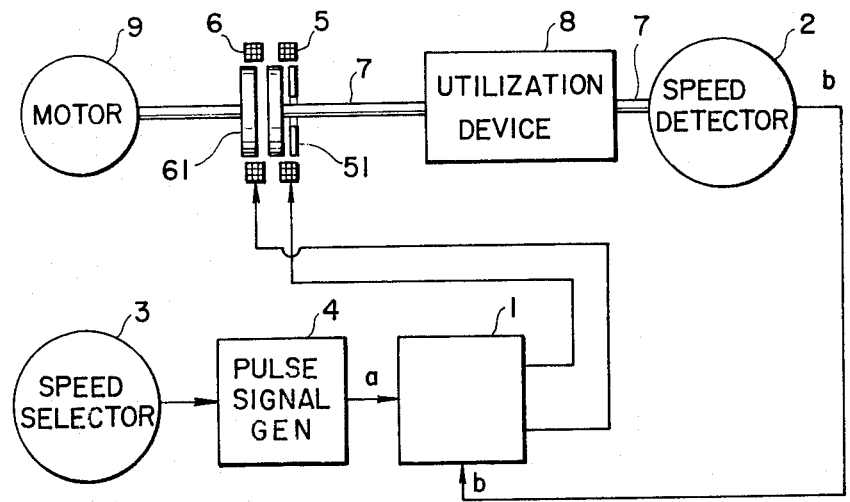
FIG. 1 is a block diagram of a clutch motor to which a control circuit according to the invention is applied.

Shown in FIG. 1 is a block diagram of a clutch motor to which a control circuit according to the invention for controlling a shaft speed of a motor having clutch and brake devices is applied. In general, a clutch motor having clutch and brake devices has a motor 9 for supplying rotating power to a shaft 7, a friction clutch 61, and a friction brake 51. The rotating power of the shaft 7 is transmitted to and is utilized for a utilization device 8, such as machine.

A control circuit 1 for controlling the actuations of the clutch and brake devices receives the outputs of a speed selector 3 for setting a desired-speed, a pulse signal generator 4 which provides a desired-speed pulse signal $a$ with a period inversely proportional to the desired-speed of the speed selector, and a speed detector 2 which provides an actual speed pulse signal $b$ with a period inversely proportional to the actual rotating speed of the shaft 7.

Figure 2:
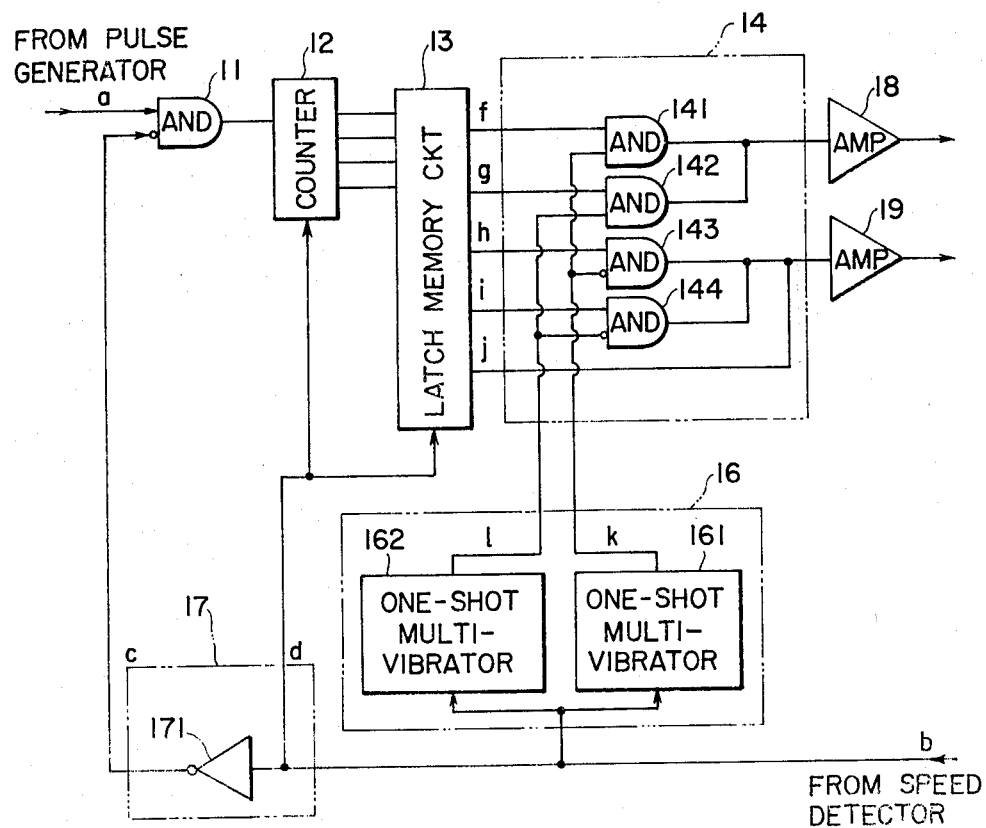
FIG. 2 is a circuit diagram of a preferred embodiment of the control circuit according to the invention.

As apparent from a circuit diagram illustrated in FIG. 2, the control circuit 1 comprises an AND gate 11 which has one input terminal connected to the output terminal $a$ of the pulse signal generator 4 and another input terminal connected to the output terminal $b$ of the speed detector 2. The output terminal of the AND gate 11 is connected to an input terminal of a counter 12. Output terminals of the counter 12 are connected to input terminals of a latch memory circuit 13 for temporarily storing a count value. The latch memory circuit 13 has five output terminals $f, g, h, i$ and $j$. Among the five output terminals of the latch memory circuit 13, the four ones $f, g, h$ and $i$ are respectively connected to input terminals of AND gates 141, 142, 143 and 144 of a logical circuit 14. Output terminals of the AND gates 141 and 142 are connected to the input terminal of an amplifier 18, while output terminals of the AND gates 143 and 144 and the remaining output $j$ of the latch memory circuit 13 are all connected to the input terminal of an amplifier 19.

Further, the output terminal $b$ of the speed detector 2 is connected to two one-shot multivibrators 161 and 162 of an actuating time signal generator 16. The two one-shot multivibrators are triggered by the actual speed pulse signal of the speed detector 2, and respectively provide pulse signals. The time constant of the one-shot multivibrator 161 is shorter than that of the one-shot multivibrator 162.

An output terminal $k$ of the one-shot multivibrator 161 of the actuating time signal generator 16 is connected to the other input terminal of the AND gate 141, and is also connected through an inverter to the other input terminal of the AND gate 143. An output terminal $i$ of the other one-shot multivibrator 162 is connected to the other input terminal of the AND gate 142, and is also connected through an inverter to the other input terminal of the AND gate 144.

A gate controller 17 has an input terminal which is connected to the output terminal $b$ of the speed detector 2, and an output terminal $c$ for a signal having a phase difference of 180° from the input signal and an output terminal $d$ for a signal being in phase with the input signal. Reference numeral 171 indicates an inverter.

Figure 3A:
FIGS. 3a-3h are waveforms of input and output signals in various elements of the control circuit according to the invention.
Figure 3B:
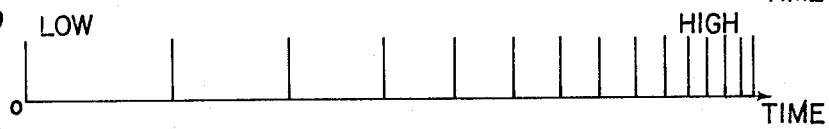

FIGS. 3a – 3h illustrate input and output signal waveforms in various elements of the control circuit. The desired-speed pulse signal of the pulse signal generator 4 is shown in FIG. 3a. The process in which the desired-speed shifts from low speed to high speed is illustrated from the left towards the right as seen in the figure. Similarly, the actual speed pulse signal delivered from the speed detector 2 and having a period inversely proportional to the actual rotating speed of the shaft is shown in FIG. 3b.

Figure 3C:
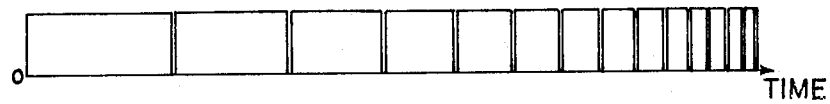

The waveform of the output signal c of the inverter 171 connected to the other input terminal of the AND gate 11, is shown in FIG. 3c. The AND gate 11 permits the desired-speed pulse signal to pass therethrough only during the time interval during which the signal shown in FIG. 3c is at the level 1. The pulses contained within the desired-speed pulse signal having passed through the AND gate 11 are counted by the counter 12. The resultant count value is temporarily stored in the latch memory circuit 13. The counter 12 and the latch memory circuit 13 are reset by a reset signal at the output terminal d of the gate controller 17 which a waveform similar to that shown in FIG. 3b.

In response to the count value, the latch memory circuit 13 provides an output signal at one of the output terminals f, g, h, i and j thereof until the memory circuit 13 is subsequently reset by the reset signal.

The relationships between the count values and the output terminals in the present embodiment are given in the following table 1:

Table 1

| Count Value | Output Terminal | Operation |
|---|---|---|
| 0 – 7 | f | brake |
| 8 – 11 | g | brake |
| 12 – 13 | h | clutch |
| 14 | i | clutch |
| 15 | j | clutch |

Figure 3D:

When the output signal appears at the output terminal f of the latch memory circuit 13, the AND gate 141 of the logical circuit 14 is enabled, so that the output pulse signal of the one-shot multivibrator 161 is amplified by the amplifier 18 and supplied to a brake coil 5. The waveform of the output pulse signal is shown in FIG. 3d.

Figure 3E:
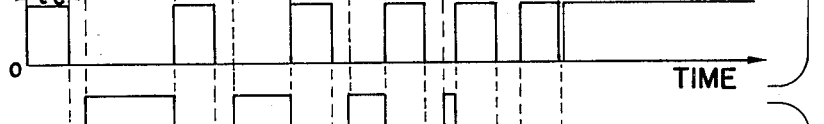
Figure 3F:

When the output signal appears at the output terminal g of the latch memory circuit 13, the AND gate 142 of the logical circuit 14 is enabled, and the output signal of the one-shot multivibrator 162 is transmitted to the amplifier 18. The amplified output is supplied to the brake coil 5. FIG. 3e shows the waveform. As is apparent from FIGS. 3d and 3e, the pulse width $\tau_k$ of the one-shot multivibrator 161 is longer than that $\tau_e$ of the one-shot multivibrator 162.

Where the output signal appears at the output terminal h of the latch memory circuit 13, the inverted output pulse signal of the one-shot multivibrator 161 as is shown in FIG. 3f is supplied through the amplifier 19 to a clutch coil 6 by way of the AND gate 143.

Figure 3G:
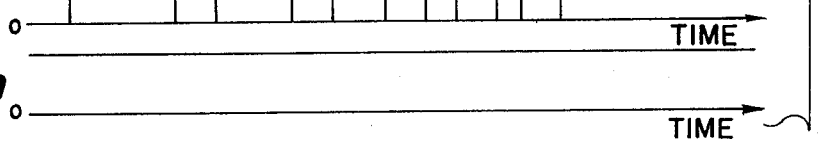
Figure 3H:

Similarly, where the output signal appears at the output terminal i of the latch memory circuit 13, the inverted output signal of the one-shot multivibrator 162 as is shown in FIG. 3g is supplied through the AND gate 144 to the amplifier 19. The amplified output is supplied to the clutch coil 6.

Where the output signal appears at the output terminal j of the latch memory circuit 13, it is directly amplified by the amplifier 19, and the amplified signal is delivered to the clutch coil 6. FIG. 3h shows the output waveform of the amplifier 19 at that time.

Figure 4A:
FIGS. 4a-4d are output waveforms for explaining the operation of the control circuit according to the invention.
Figure 4B:
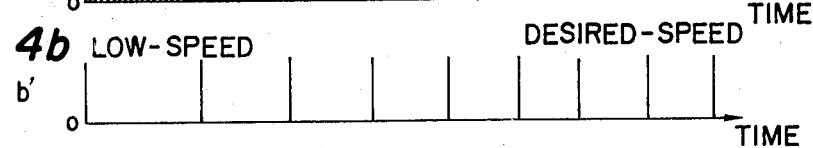
Figure 4C:
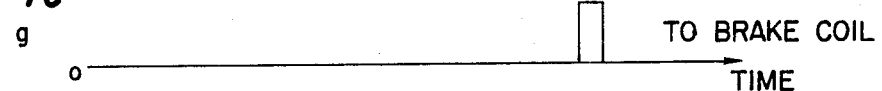
Figure 4D:
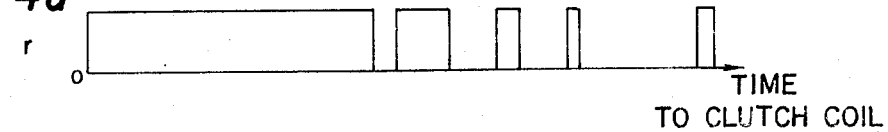

FIGS. 4a - 4d illustrate the operation process in which the rotating speed of the shaft 7 actually shifts from a low speed to a desired-speed. FIG. 4a shows a desired-speed pulse signal which has a prescribed period corresponding to a certain desired-speed. FIG. 4b shows an actual speed pulse signal which has a period being inversely proportional to the actual rotating speed of the shaft.

Where the actual rotating speed of the shaft 7 is low, the counter 12 counts fifteen or more pulses of the desired-speed pulse signal during the period of the actual speed pulse signal, as is illustrated in FIG. 4b. The output signal appears at the output terminal j of the latch memory circuit 13, a current is caused to continuously flow through the clutch coil 6 as is shown in FIG. 4d, and the clutch device is actuated. Thus, the actual rotating speed of the shaft 7 increases gradually, and the period of the actual speed pulse signal diminishes. Therefore, the number of pulses of the desired-speed pulse signal counted by the counter 12 during the period of the actual speed pulse signal decreases. When the count value becomes fourteen, the output signal appears at the output terminal i of the latch memory circuit 13, and current is caused to flow through the clutch coil 6 during a certain time interval. The time interval during which the clutch coil 6 is actuated, i.e., during which current flows through the clutch coil 6, is determined by the pulse widths of the output pulse signals of the one-shot multivibrators 161 and 162 of the actuating time signal generator 16. Further, when the count value reaches twelve, the output signal appears at the output terminal h of the latch memory circuit 13, and the period of the current flowing through the clutch coil becomes even shorter (FIG. 4d).

Where the actual rotating speed of the shaft 7 is increased and exceeds the desired-speed by the above operation, that is, where the counter 12 counts eleven pulses of the desired-speed pulse signal during the period of the actual speed pulse signal, the output signal appears at the output terminal g of the latch memory circuit 13. Thus, an output pulse signal of the one-shot multivibrator 162 is provided from the logical circuit 14. During the pulse width of the output pulse signal, current flows through the brake coil and the brake device is maintained actuated (FIG. 4c).

When the brake device is actuated and the actual rotating speed of the shaft becomes lower than the desired-speed, current flows through the clutch coil again so as to accelerate the shaft 7 (refer to the right end of FIG. 4d).

In this way, the clutch operation and the braking operation are repeated, and the desired-speed of the shaft 7 is maintained.

What is claimed is:

1. A control circuit for controlling the shaft speed of a motor having clutch and brake devices comprising:
   a speed detector for detecting the actual rotating speed of said shaft and generating a first pulse signal having a period in inverse proportion to said actual rotating speed;
   a speed selector for setting a desired-speed of said shaft;
   a signal generator for generating a second pulse signal having a period in inverse proportion to the desired-speed from said speed selector;
   first means for detecting the ratio of the period of the first signal to the period of the second signal; and
   second means for actuating said brake device where said ratio is less than or equal to a predetermined value, for actuating said clutch device when said ratio exceeds said predetermined value.

2. A control circuit as claimed in claim 1, wherein said second means further comprises means for controlling the duration of actuation of said clutch and brake devices.

3. A control circuit claimed in claim 2, wherein said duration controlling means comprises two one-shot multivibrators having different time constants relative to each other.

4. A control circuit for controlling the shaft speed of a motor having clutch and brake devices comprising:
- a clutch coil for actuating said clutch device;
- a brake coil for actuating said brake device;
- a speed detector for detecting, the actual rotating speed of the shaft and generating a pulse signal having a period in inverse proportion to said actual rotating speed;
- a speed selector for setting the desired speed of said shaft;
- a pulse signal generator for generating a pulse signal having a period in inverse proportion to the desired speed from said speed detector;
- means for detecting the ratio of the period of the pulse signal from said speed detector to the period of the pulse signal from said pulse signal generator;
- an actuating time signal generator for generating a time signal having a predetermined pulse width in response to the signal from said speed detector; and
- a logical circuit for supplying said time signal to said brake and clutch coils according to said ratio.

5. A control circuit claimed in claim 4, wherein said ratio detecting means comprises a counter for counting the desired speed pulse signal for every period of the actual speed pulse signal; and
- a memory for memorizing the counted number of desired speed pulses for the period of the actual speed pulse signal and for producing an output signal in accordance with said counted number of pulses.

6. A control circuit claimed in claim 4, wherein said actuating time signal generator comprises two one-shot multivibrators, the time constant of each of which determines said predetermined pulse width.

7. A control circuit for controlling the shaft speed of a motor having clutch and brake devices comprising:
- a friction clutch having a clutch coil and for connecting the motor to a load during excitation of the clutch coil;
- a friction brake having a brake coil and for disconnecting the load from the motor and actuating the braking force to the load upon excitation of the brake coil;
- a speed detector for detecting the actual rotating speed of the load and generating a speed pulse train having a period in inverse proportion to the actual speed;
- a speed selector for setting the desired speed of the load;
- a pulse signal generator for generating a desired speed pulse train having a period in inverse proportion to the desired speed from said selector;
- a counter for counting the desired speed pulses for every period of the actual speed pulses;
- a memory for storing the counted number of desired speed pulses for the period of the actual speed pulses;
- two one-shot multivibrators having different time constants relative to each other and for producing actuating time signals with pulse width according to the time constant in response to the actual speed pulses; and
- a logical circuit for selectively passing the outputs from said one-shot multivibrators to said clutch or brake device in accordance with the stored contents of said memory.

* * * * *